Aug. 20, 1935.   J. F. McKEAGE   2,011,937
TAPPING BUSH FOR BEER BARRELS
Filed May 5, 1934
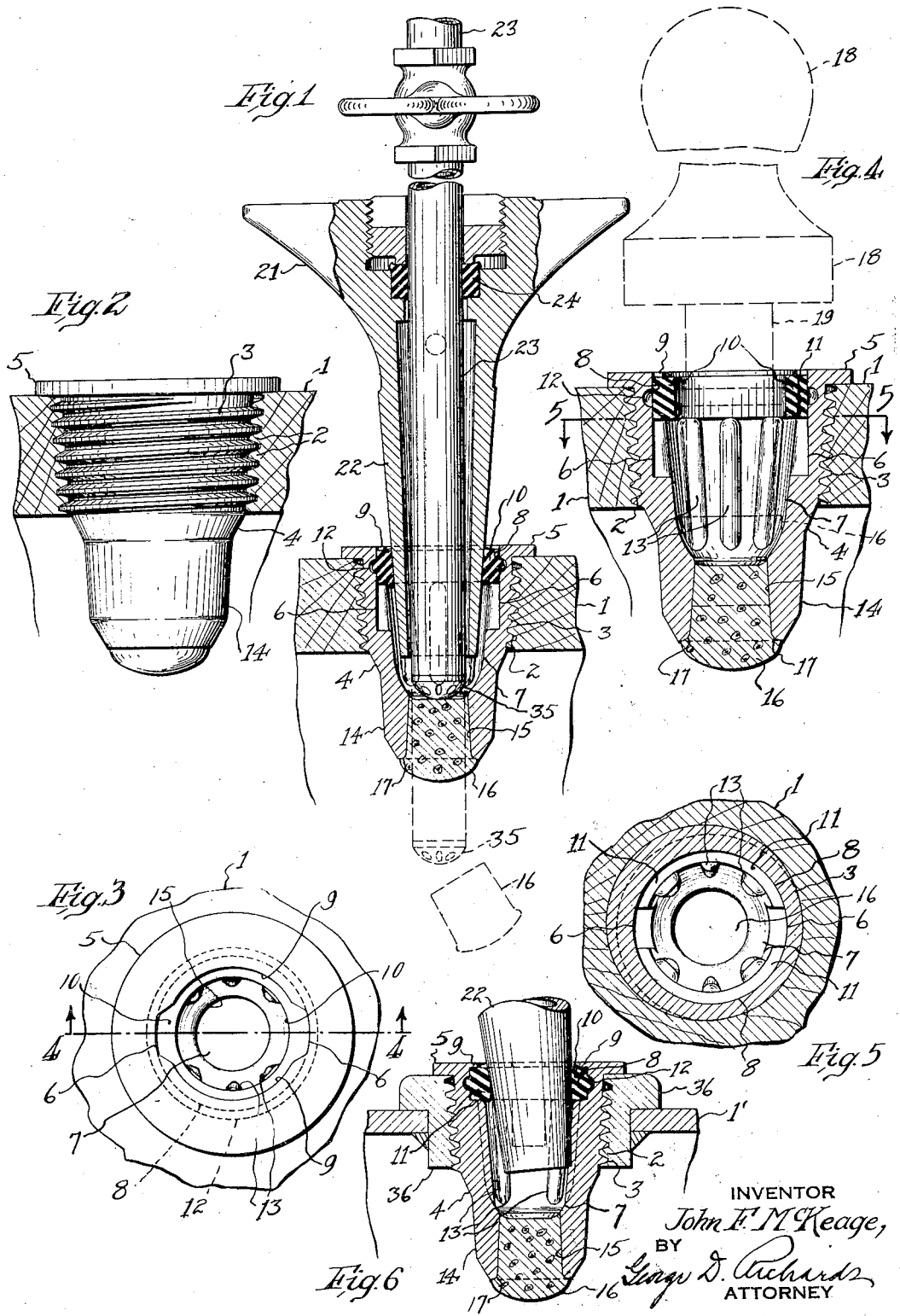
INVENTOR
John F. McKeage,
BY
George D. Richards
ATTORNEY Patented Aug. 20, 1935

2,011,937

UNITED STATES PATENT OFFICE 2,011,937

TAPPING BUSH FOR BEER BARRELS

John F. McKeage, Montrose, Pa.

Application May 5, 1934, Serial No. 724,124

2 Claims. (Cl. 217—113)

This invention relates, generally, to closure means for kegs and barrels, such as beer barrels, and the invention has reference, more particularly, to a novel improved tapping bush or plug designed to enable barrels to be tapped easily, quickly and without waste.

In tapping kegs or barrels such as beer barrels equipped with tapping bushings or bungs heretofore used, it has been generally necessary to remove the wooden or other plug from the bush or bushing aperture and thereafter insert the tapping member which serves to close the bush aperture in the barrel. During the interval of time elapsing between the removal of the plug and the insertion of the tapping member, the contents of the barrel are free to escape and do escape, especially when the contents of the barrel are subject to gas pressure as in the case of beer, resulting in considerable waste as well as inconvenience and annoyance to the person tapping the barrel.

The principal object of the present invention is to provide a novel tapping bush or bung which is so constructed and arranged as to enable the ready tapping of a barrel equipped with the same without waste or escape of the barrel contents, and without loss of gas pressure, if any exists, within the barrel.

Another object of the present invention lies in the provision of a novel tapping bush of the above character that is adapted to be readily threaded into a barrel tapping hole and which serves to positively close and seal the barrel indefinitely, the said tapping bush being easily and quickly opened when desired, however, by the insertion thereinto of the proper tapping fitting.

Still another object of the present invention is to provide a novel tapping bush of the above character that is of rugged and substantially fool-proof construction, the said bush being so designed as to be unharmed by careless or imperfect tapping or the forceful driving of the tapping tool thereinto, while providing a seal for the tapping tool so as to effectively prevent loss of the barrel contents during or after the tapping operation.

A fourth object of the present invention lies in the provision of a novel tapping bush of the above character having a sealing gasket that is retained in place by suction as well as by mechanical means, whereby the said gasket is prevented from being accidentally withdrawn when the tapping member is removed from the bush.

Other objects of this invention, not at this time more particularly enumerated, will be clearly understood from the following detailed description of the same.

The invention is clearly illustrated in the accompanying drawing, in which:

Fig. 1 is a fragmentary vertical sectional view showing the novel bush of this invention about to be tapped by a tapping member.

Fig. 2 is an enlarged fragmentary view showing the bush in elevation threaded into a barrel head shown in section.

Fig. 3 is a plan view of the structure shown in Fig. 2.

Fig. 4 is a sectional view taken along line 4—4 of Fig. 3, a cork inserting tool being shown in dash lines for illustrating the manner of inserting corks into the bush.

Fig. 5 is a sectional view taken along line 5—5 of Fig. 4, and

Fig. 6 is a fragmentary vertical, part sectional view illustrating the action of the bush during the improper insertion of the tapping member or tool.

Similar characters of reference are employed in said views, to indicate corresponding parts.

Referring now to the several views of the said drawing, the reference numeral 1 designates a portion of a barrel head or stave having a somewhat tapered hole provided with threads 2 for receiving the upper threaded portion 3 of the novel tapping bush 4 of this invention. The top of the bush 4 is provided with an annular outwardly directed flange 5 that is adapted to abut the outer surface of the barrel head or stave 1 when the bush is threaded fully into the barrel aperture. As especially shown in Figs. 1, 3, 4, and 5, the bush 4 is provided with oppositely arranged and diametrically disposed wrench receiving slots or sockets 6 that extend downwardly for a distance from the top of the bush at opposite sides of the central vertical recess or cavity 7 of the bush. By inserting the proper wrench downwardly into slots 6 and turning the same, the bush flange 5 may be screwed down tight against the barrel 1, so that the bush, in effect, becomes a part of this barrel or cask.

The slots 6 intersect an annular gasket receiving recess 8 provided in the bush 1 just below its top, the said recess 8 communicating with the central bush cavity 7. The presence of gasket receiving recess 8 produces substantially semi-annular lips or inwardly directed flanges 9 at the top of the bush 4 which flanges serve to assist in retaining a flexible gasket 10 within the annular recess 8. Substantially semi-annular shoulders 11 determine the bottom of recess 8, the gasket 10 being confined between lips 9 and shoulders 11.

The outer wall of the recess 8 is provided with an annular groove 12 that surrounds the periphery of gasket 10 when this gasket is seated in recess 8. Gasket 10 is of annular shape and is preferably of resilient material such as rubber, the said gasket being readily inserted, owing to its flexibility and resiliency, through the open top of the bush and into recess 8. When this gasket becomes worn in use, the same may be readily removed from recess 8 as by inserting a flat tool into one of the slots 6 and forcing the gasket radially inwardly.

Below the recess 8, the side walls of the central cavity 7 taper or converge radially inwardly somewhat and are provided with a plurality of mutually spaced reenforcing and guiding ribs 13 that extend substantially vertically within the aperture 7. The lower or inner portion 14 of bush 4 is of somewhat reduced diameter and is provided with a vertical cork receiving aperture or throat 15 for receiving a stopper or cork 16. Aperture or throat 15 communicates at its bottom with the interior of barrel 1 and at its top with the cavity 7. The side wall of throat 15 preferably tapers or converges upwardly and radially inwardly slightly, for example about .002 inch per inch length, to thereby the better retain the cork or stopper 16 in place in this throat and against the outward pressure of the barrel contents. The lower edge portion of the side wall of throat 15 is beveled or rounded at 17 to enable the compressed cork to flare outwardly at its bottom, thereby effectively preventing accidental upward dislodgment of this cork due to internal gas pressure within the barrel.

A tool of the type shown in dash lines in Fig. 4, is preferably used to insert the cork 16 downwardly through cavity 7 and into the throat 15. This tool consists of a handle 18 having a shank 19. The cork 16 is first inserted in an upright position into cavity 7, the said cork being of larger diameter than the throat 15, as shown in dash lines in Fig. 4. By pressing downwardly upon handle 18, the cork 16 is forced downwardly into throat 15 while being radially compressed, thereby obtaining a good grip on the side wall of throat 15. The cork is pushed downwardly until the lower end of shank 19 engages against the bottom of cavity 7 at which time the lower end of cork 16 has passed slightly below the bottom of the bush 4, and since the restraining force of the side wall of throat 15 is no longer exerted upon this lower end portion of the cork, the same is free to expand, and does expand around the rounded edge portion 17 of the bush, so that this rounded edge portion provides, in effect, a stop shoulder for the lower portion of the cork, and cooperates with the tapered wall of throat 15 to prevent the upward escape of the cork due to gas pressure within the barrel. With the bush 4 thus sealed by the cork 16, the contents of the barrel are retained without loss for indefinite periods as during storage and shipping.

The novel bush of this invention is adapted to be tapped with a standard tapping member or tool (see Fig. 1) consisting of a fitting 21 having a tapered, cylindrical shank 22 for insertion into the cavity 7 of the bush. As the tapered shank 22 is pushed down into the open mouth of cavity 7, it engages the resilient gasket 10 which immediately snugly engages the sides of shank 22. Continued downward pressure upon fitting 21 causes shank 22 to press gasket 10 radially outwardly somewhat so that a portion of this gasket is forced into annular groove 12 while forcing the air out of this groove. Upon release of the downward pressure upon fitting 21, the same is firmly gripped and retained in assembled relation with the bush 4 by the gripping action of gasket 10 upon the tapered shank 22, this gasket serving as an effective seal between the bush 4 and the shank 22.

The longitudinal tapping pipe 23 of the tapping tool is now pushed downwardly through the hollow interior of fitting 21. A gasket 24 serves to seal the pipe 23 within the fitting 21 while permitting relative movement of the pipe and fitting. This pipe 23 has a strainer inlet 35 at its lower end which engages the cork 16 as pipe 23 is pushed down and drives this cork downwardly into the interior of the barrel 1, thereby tapping the barrel. During or after the tapping of the barrel it is impossible for the liquid or volatile content of the barrel to escape therefrom owing to the presence of the gasket 10 which effectively seals the joint between the bush 4 and the fitting 21.

Even if the fitting 21 is pushed from side to side or pulled upon, the gasket 10 nevertheless serves to effectively seal the joint between the bush and the fitting. The suction effect created by the reduced air pressure in annular groove 12 of the bush aids materially in retaining gasket 10 in place in annular recess 8 regardless of how fitting 21 is inserted or removed. Thus, in Fig. 6 the fitting 21 is shown being driven into the bush cavity 7 at an angle to the centerline of the bush. In this case, the inner portion of gasket 10 distorts so as to conform to the shape of the fitting 21 while the outer portion of the gasket is held firmly in recess 8 by the holding action of lips 9 and shoulders 11 and by the suction action of groove 12. One or more of the ribs 13 serves to guide the lower end of fitting 21 downwardly and prevents the bursting of the bush by the improperly inserted tapping fitting 21. When the fitting 21 is withdrawn, the groove 12 cooperates with lips 9 and shoulders 11 to prevent the gasket 10 being withdrawn with the fitting.

In Fig. 6 the bush 4 is shown inserted into a metal barrel 1', the said barrel being shown as provided with a tapped fitting 36 for receiving the bush 4. In this case the fitting 36 and the bush 4 should preferably be made of the same metal as the barrel 1'. If desired, the fitting 36 may be omitted, and the unthreaded bush 4 welded or otherwise permanently secured within the barrel aperture.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:

1. A tapping bush of the character described comprising, a substantially hollow cylindrical member having a threaded upper portion and a reduced lower portion, an outwardly extending annular flange provided at the top of said cylindrical member for engaging the outer surface of a barrel, said cylindrical member having an annular gasket receiving recess within its hollow interior adjacent the top of said member, the outer annular wall of said receiving recess having a circumferential suction groove therein, a resilient, flexible gasket withn said receiving recess, substantially vertically extending reenforcing and guiding ribs provided within the hollow interior of said cylindrical member below said gasket, said cylindrical member having a downwardly and outwardly tapered cork receiving throat within its lower reduced portion.

2. A tapping bush of the character described comprising, a hollow, substantially cylindrical member, adapted to receive a tapping tool and having a threaded upper portion and a reduced lower portion, said cylindrical member having an annular gasket receiving recess within its hollow interior adjacent the top of said member, the outer wall of said gasket receiving recess being cylindrical and having a circumferential, radially outwardly extending suction groove therein, a resilient annular gasket within said receiving recess, said gasket having a cylindrical outer wall engaging the vertical wall of said receiving recess and bridging the suction groove therein and having a cylindrical inner wall for engaging the tapping tool in sealed relation, whereby when the tapping tool is inserted, it serves to press the resilient gasket radially outwardly somewhat so that a portion of this gasket is forced into said suction groove, thereby driving air out of said groove and creating a suction effect upon said gasket, which suction effect serves to aid in retaining the gasket in place and in sealing the gasket within said receiving recess, said cylindrical member having a cork receiving throat in its lower portion.

JOHN F. McKEAGE.